(12) United States Patent
Nagai

(10) Patent No.: US 10,397,422 B2
(45) Date of Patent: Aug. 27, 2019

(54) CONTROL APPARATUS AND NON-TRANSITORY COMPUTER-READABLE MEDIUM STORING PROGRAM

(71) Applicant: SEIKO EPSON CORPORATION, Tokyo (JP)

(72) Inventor: Takashi Nagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/923,637

(22) Filed: Mar. 16, 2018

(65) Prior Publication Data

US 2018/0278776 A1    Sep. 27, 2018

(30) Foreign Application Priority Data

Mar. 21, 2017 (JP) ................................. 2017-054832

(51) Int. Cl.
*G06F 15/00* (2006.01)
*H04N 1/00* (2006.01)
*G06F 3/12* (2006.01)

(52) U.S. Cl.
CPC ....... *H04N 1/00663* (2013.01); *G06F 3/1205* (2013.01); *G06F 3/1219* (2013.01); *G06F 3/1256* (2013.01); *G06F 3/1285* (2013.01); *H04N 1/0066* (2013.01)

(58) Field of Classification Search
CPC . H04N 1/00663; H04N 1/0066; G06F 3/1219
USPC .............................................. 358/1.12, 1.15
See application file for complete search history.

(56) References Cited

U.S. PATENT DOCUMENTS

| 8,542,397 | B2 * | 9/2013 | Yamaguchi | G03G 15/502 |
| | | | | 358/1.18 |
| 9,185,252 | B1 * | 11/2015 | Kowaka | H04N 1/0044 |
| 2014/0153014 | A1 * | 6/2014 | Kaneda | H04N 1/00448 |
| | | | | 358/1.12 |

FOREIGN PATENT DOCUMENTS

JP    2016-26341 A    2/2016

* cited by examiner

*Primary Examiner* — Saeid Ebrahimi Dehkordy
(74) *Attorney, Agent, or Firm* — Workman Nydegger

(57) ABSTRACT

A control apparatus includes a processor that causes a preview to be displayed for an image to be printed on a print medium by a printing apparatus and a display that displays the preview. The processor causes the display to display the preview including one or more page images on a first side and one or more page images on a second side such that a positional relationship between a position of a page image on the first side of a print medium and a position of a page image on the second side of the print medium is shown, and adjusts the positions of the page images on the first side and second side such that a position of a blank area between the page images on the first side corresponds to a position of a blank area between the page images on the second side.

14 Claims, 7 Drawing Sheets

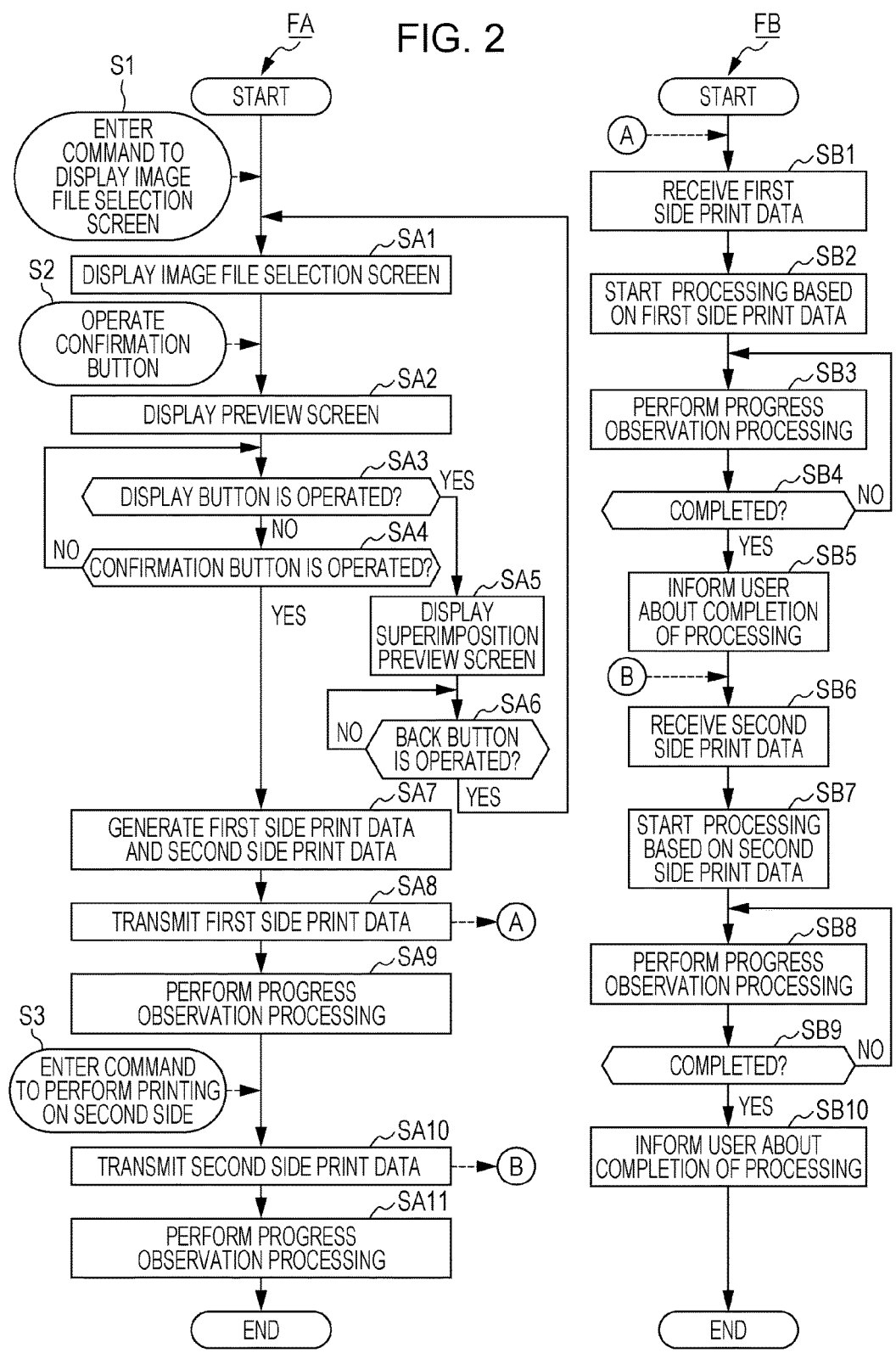

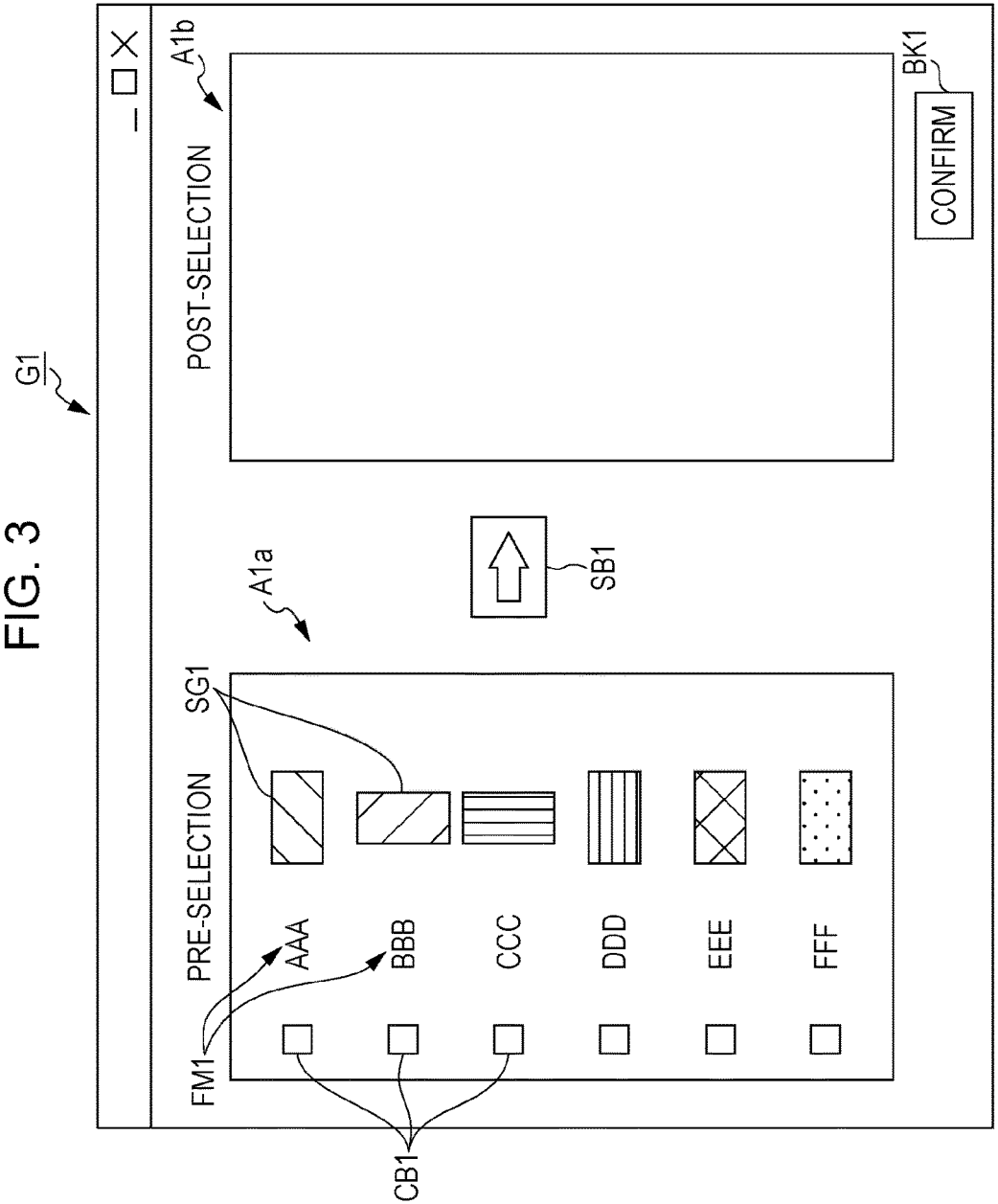

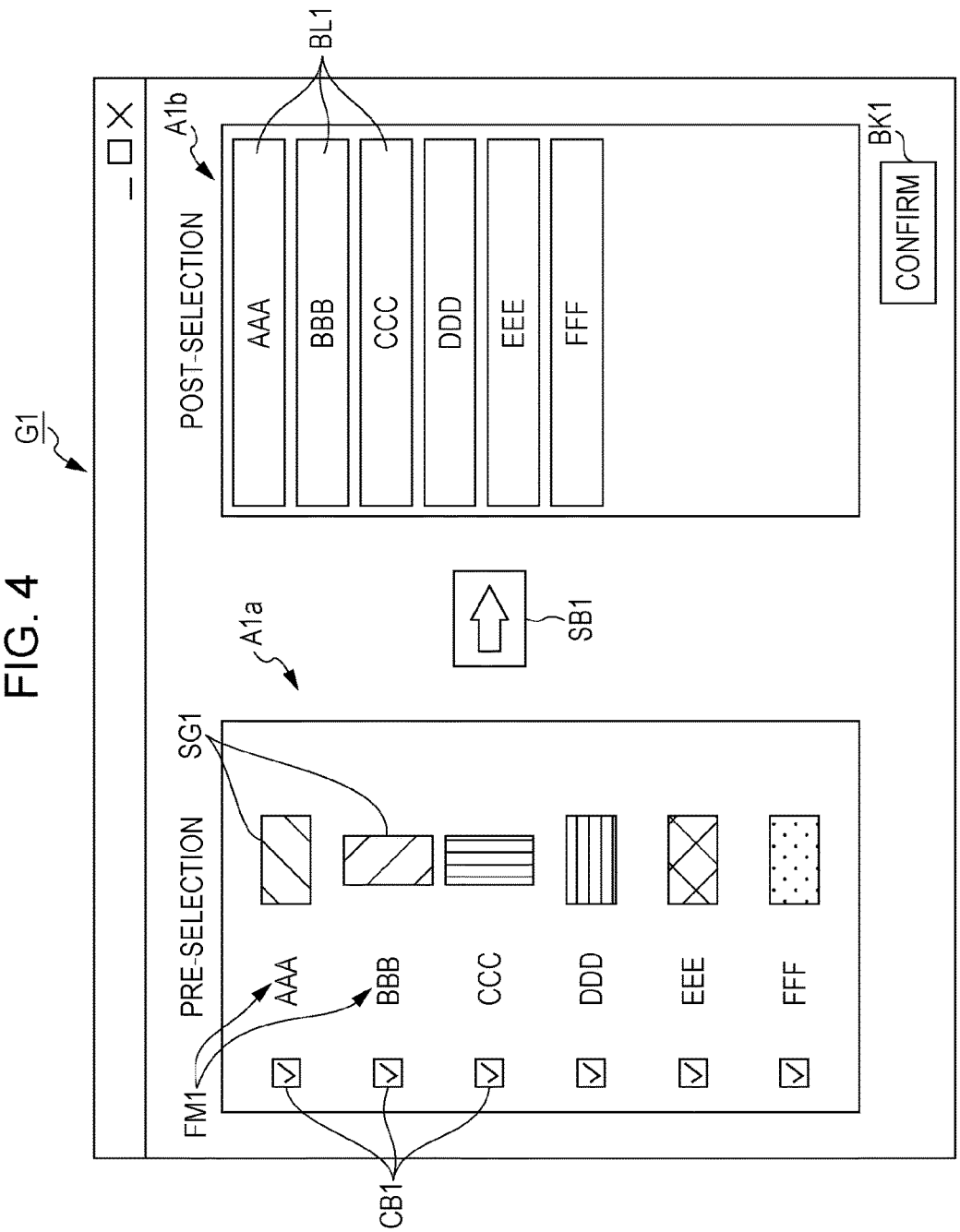

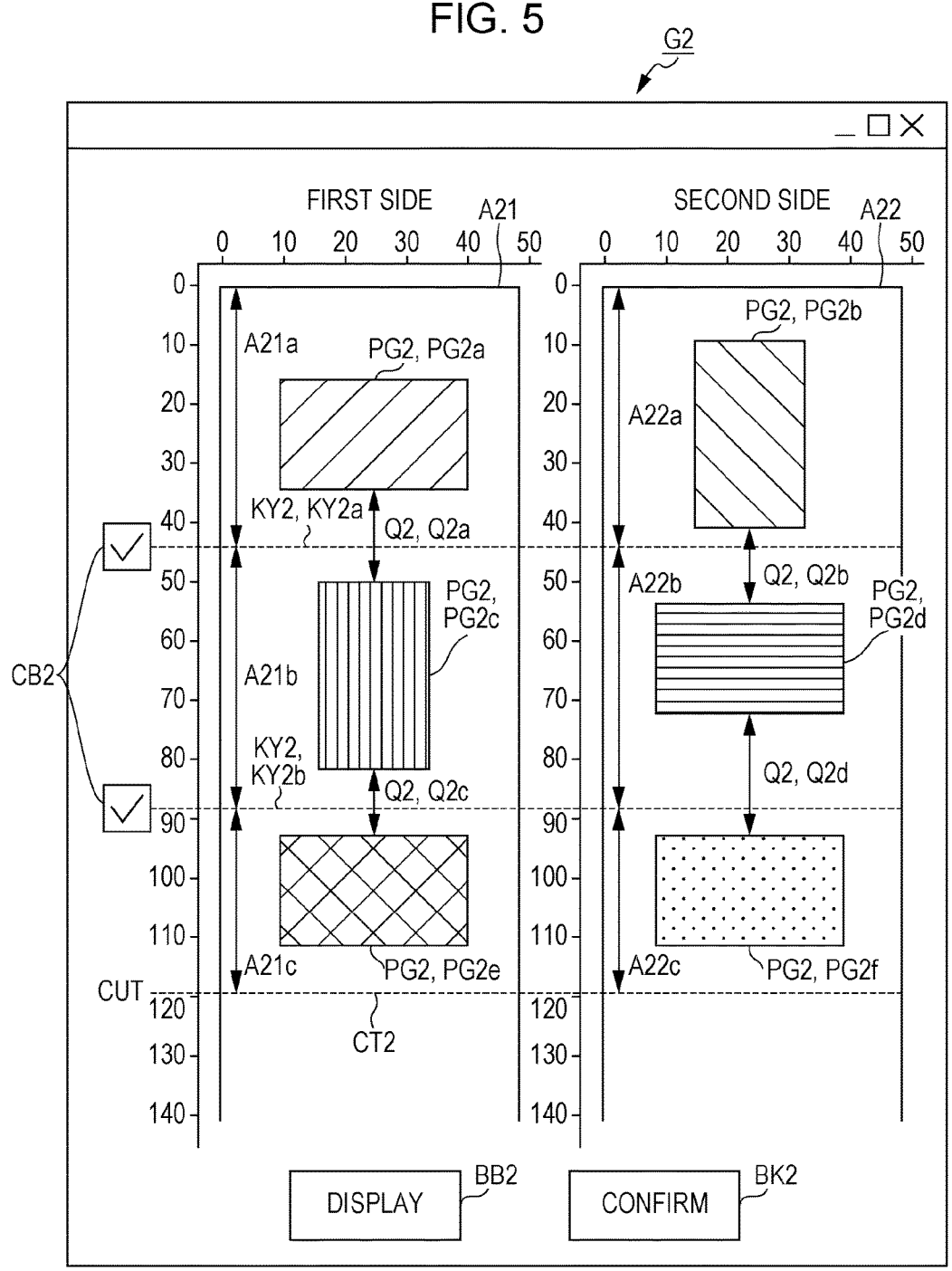

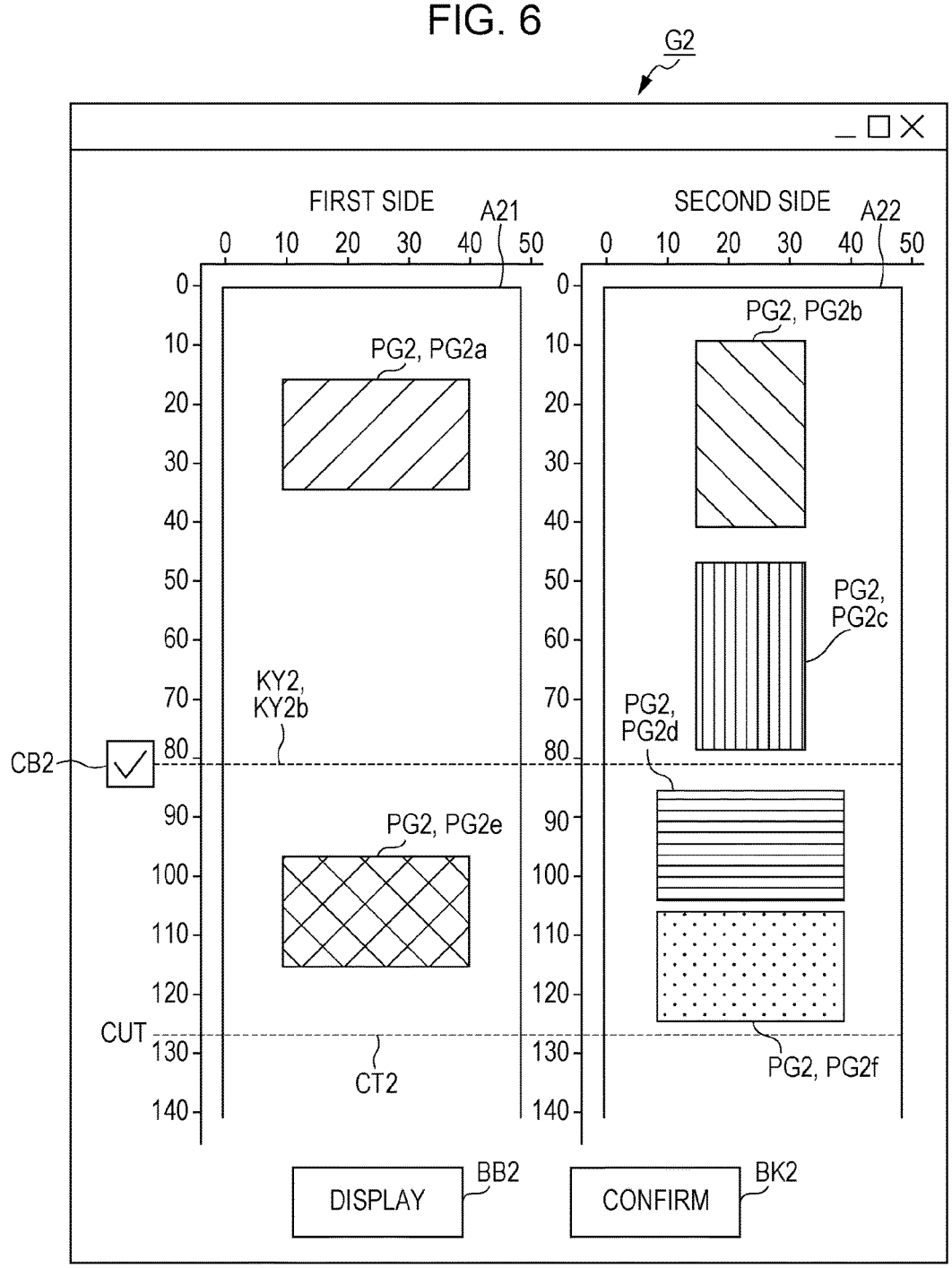

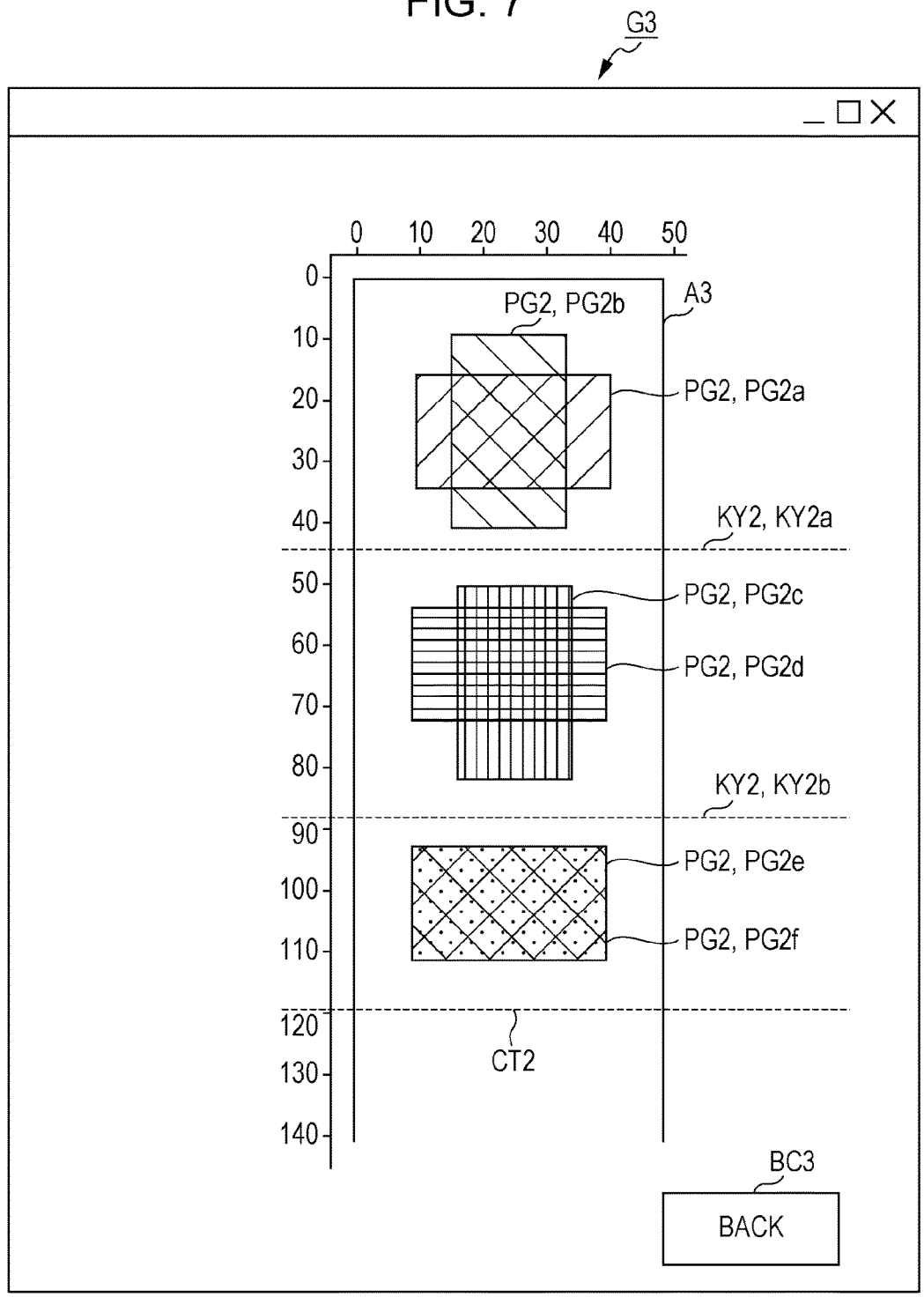

CONTROL APPARATUS AND NON-TRANSITORY COMPUTER-READABLE MEDIUM STORING PROGRAM

CROSS-REFERENCE TO RELATED APPLICATIONS

The present application claims priority to Japanese Patent Application No. 2017-054832, filed Mar. 21, 2017, which is hereby incorporated by reference in its entirety.

BACKGROUND

1. Technical Field

The present invention relates to a control apparatus and a non-transitory computer-readable medium storing a program.

2. Related Art

A control apparatus (information processing apparatus) causing a preview to be displayed for images to be printed by a printing apparatus is known (see, for example, JP-A-2016-26341).

Meanwhile, a technique for performing printing on both sides of a print medium by using a printing apparatus is widely employed.

When a control apparatus causes a preview to be displayed in a case of printing images on both sides of a print medium by using a printing apparatus, the preview needs to be displayed such that the preview is displayed in a manner appropriately showing that the images are to be printed on both sides of a print medium.

SUMMARY

An advantage of some aspects of the invention is that, in a case in which a preview for images to be printed on both sides of a print medium is displayed, the preview can be displayed such that the images are displayed on the preview in a manner appropriately showing that the images are to be printed on both sides of a print medium.

A control apparatus according to an aspect of the invention includes a processor that causes a preview to be displayed for an image to be printed on a print medium by a printing apparatus and a display that displays the preview. The processor causes the display to display the preview, which includes one or more page images on a first side and one or more page images on a second side, such that a positional relationship between a position of a page image on a first side of a print medium and a position of a page image on a second side of the print medium being shown. The processor also adjusts the positions of the page images on the first side and the positions of the page images on the second side such that a position of a blank area between the page images on the first side corresponds to a position of a blank area between the page images on the second side.

This configuration enables a user to accurately grasp positional relationships between the page images on the first side and the page images on the second side by referring to the preview. Furthermore, with this configuration, the processor adjusts the positions of the page images on the first side and the positions of the page images on the second side so that a position of a blank area between the page images on the first side corresponds to a position of a blank area between the page images on the second side. As a result, the page images are arranged at appropriate positions on the preview on the basis of printing to be performed on both the first side and the second side. That is, with this configuration, when the processor displays the preview for the images to be printed on both sides of a print medium, the preview can be displayed such that the images are displayed on the preview in a manner appropriately showing that the images are to be printed on both sides of a print medium.

In this case, the processor may allocate to the first side or the second side the page images selected as the page images to be displayed on the preview and adjust the positions of the page images on the first side and the positions of the page images on the second side.

With this configuration, the preview is displayed in a state in which the page images selected as the page images to be displayed on the preview are allocated by the processor to the first side or the second side. As a result, the preview can be an appropriate screen on the basis of printing to be performed on both the first side and the second side.

In this case, the processor may adjust the positions of the page images on the first side and the positions of the page images on the second side such that the page images on the first side and the page images on the second side are arranged in one-to-one correspondence.

With this configuration, the preview is displayed such that the positions of the page images on the first side and the positions of the page images on the second side are adjusted by the processor such that the page images on the first side and the page images on the second side are arranged in one-to-one correspondence. As a result, the preview can be an appropriate screen on the basis of printing to be performed on both the first side and the second side.

In this case, the processor may cause an image representing a boundary between the page images to be displayed at a position corresponding to a blank area.

This configuration enables the user to accurately grasp a positional relationship between a blank area on the first side and a blank area on the second side by referring to the preview.

In this case, the processor may cause the page images to be displayed such that modifying the page images, which includes moving the page images to and from the first side and the second side, can be performed.

With this configuration, the user can adjust a page image appearance. The adjustment includes selecting on which of the first side and the second side the page image is to be printed.

In this case, the processor may cause positional relationships between the page images on the first side and the page images on the second side to be displayed on a superimposition preview, in which the page images on the first side and the page images on the second side are displayed in a superimposed manner.

This configuration enables the user to more accurately grasp positional relationships between the page images on the first side and the page images on the second side by referring to the superimposition preview.

In this case, the page images on at least one of the first side and the second side may be translucent when displayed.

This configuration enables the user to more accurately grasp positional relationships between the page images on the first side and the page images on the second side by referring to the superimposition preview.

According to another aspect of the invention, a non-transitory computer-readable recording medium stores a program that causes a processor of a control apparatus to execute a process. The process includes causing a preview to be displayed for an image to be printed on a print medium by a printing apparatus, which includes one or more page images on a first side and one or more page images on a second side, such that a positional relationship between a page image on a first side of a print medium and a page image on a second side of the print medium are shown. The process also includes adjusting the positions of the page images on the first side and the positions of the page images on the second side such that a position of a blank area between the page images on the first side corresponds to a position of a blank area between the page images on the second side.

This configuration enables a user to accurately grasp positional relationships between the page images on the first side and the page images on the second side by referring to the preview. Furthermore, with this configuration, the processor adjusts the positions of the page images on the first side and the positions of the page images on the second side so that a position of a blank area between the page images on the first side corresponds to a position of a blank area between the page images on the second side. As a result, the page images are arranged at appropriate positions on the preview on the basis of printing to be performed on both the first side and the second side. That is, with this configuration, when the processor displays the preview for the images to be printed on both sides of a print medium, the preview can be displayed such that the images are displayed on the preview in a manner appropriately showing that the images are to be printed on both sides of a print medium.

In this case, the processor may allocate to the first side or the second side the page images selected as the page images to be displayed on the preview and adjust the positions of the page images on the first side and the positions of the page images on the second side.

With this configuration, the preview is displayed in a state in which the page images selected as the page images to be displayed on the preview are allocated by the processor to the first side or the second side. As a result, the preview can be an appropriate screen on the basis of printing of the page images to be performed on both the first side and the second side.

In this case, the processor may adjust the positions of the page images on the first side and the positions of the page images on the second side such that the page images on the first side and the page images on the second side are arranged in one-to-one correspondence.

With this configuration, the preview is displayed such that the positions of the page images on the first side and the positions of the page images on the second side are adjusted by the processor such that the page images on the first side and the page images on the second side are arranged in one-to-one correspondence. As a result, the preview can be an appropriate screen on the basis of printing of the page images to be performed on both the first side and the second side.

In this case, the processor may cause an image representing a boundary between the page images to be displayed at a position corresponding to a blank area.

This configuration enables the user to accurately grasp a positional relationship between a blank area on the first side and a blank area on the second side by referring to the preview.

In this case, the processor may cause the page images to be displayed such that modifying the page images, which includes moving the page images to and from the first side and the second side, can be performed.

With this configuration, the user can adjust a page image appearance. The adjustment includes selecting on which of the first side and the second side the page image is to be printed.

In this case, the processor may show positional relationships between the page images on the first side and the page images on the second side in a superimposition preview, in which the page images on the first side and the page images on the second side are displayed in a superimposed manner.

This configuration enables the user to more accurately grasp positional relationships between the page images on the first side and the page images on the second side by referring to the superimposition preview.

In this case, the page images on at least one of the first side and the second side may be translucent when displayed.

This configuration enables the user to more accurately grasp positional relationships between the page images on the first side and the page images on the second side by referring to the superimposition preview.

BRIEF DESCRIPTION OF THE DRAWINGS

The invention will be described with reference to the accompanying drawings, wherein like numbers reference like elements.

FIG. 2 is flowcharts illustrating operations relating to a control apparatus and a printing apparatus.

FIG. 3 is a view of an image file selection screen.

FIG. 4 is a view of the image file selection screen.

FIG. 5 is a view of a preview.

FIG. 6 is a view of the preview.

FIG. 7 is a view of a superimposition preview.

DESCRIPTION OF EXEMPLARY EMBODIMENTS

Figure 1:
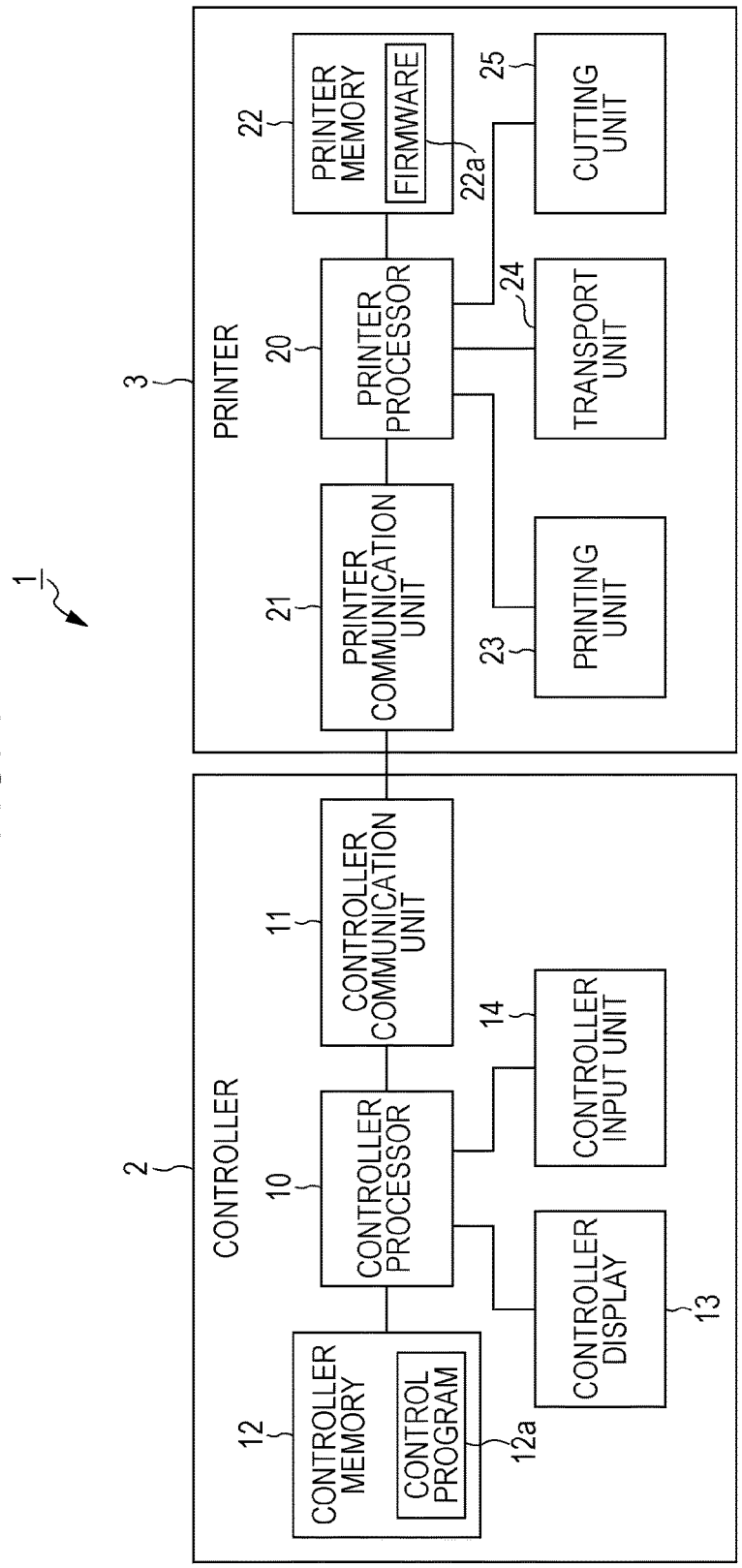
FIG. 1 is a block diagram illustrating a functional configuration of a printing system.

An exemplary embodiment of the invention will be described below with reference to the drawings.

FIG. 1 is a block diagram illustrating a functional configuration of a printing system 1 according to this embodiment.

As illustrated in FIG. 1, the printing system 1 includes a controller 2 (control apparatus) and a printer 3 capable of communicating with a host computer. In the printing system 1, the printer 3 performs printing under the control of the controller 2.

The controller 2 is a computer that functions as a host computer for the printer 3.

As illustrated in FIG. 1, the controller 2 includes a controller processor 10 (processor), a controller communication unit 11, a controller memory 12, a controller display 13, and a controller input unit 14.

The controller processor 10, which may include a CPU, a ROM, a RAM, an ASIC, a signal processing circuit, and the like, controls each unit of the controller 2. The controller processor 10 performs processing by using hardware or software by, for example: causing the CPU to load, into the RAM, a program stored in the ROM, the controller memory 12 described below, or the like; using a function implemented in the ASIC; or causing the signal processing circuit to process signals.

The controller communication unit 11 communicates with the printer 3 under the control of the controller processor 10 in accordance with a predetermined communication standard. The communication standard used in communication between the controller 2 and the printer 3 may be a wired communication standard or a wireless communication standard. The wired communication standard may be, for example, USB, a serial communication standard other than USB, such as RS-232, a parallel communication standard, such as IEEE 1284, or Ethernet (registered trademark). The wireless communication standard may be, for example, a wireless LAN standard, such as Wi-Fi (registered trademark), or a short-distance wireless communication standard, such as Bluetooth (registered trademark).

The controller memory 12 includes a non-volatile memory, such as an EEPROM, and stores various types of data.

A control program 12a (program) is installed on the controller 2. The controller processor 10 loads and executes the control program 12a, thereby performing various processing operations described below by using functions of the control program 12a. It should be noted that the control program 12a is not limited to be a single program. The control program 12a may be, for example, a group of programs including a predetermined application and a printer driver corresponding to the printer 3.

The controller display 13 includes a display panel, such as a liquid crystal display panel, and displays various types of information on the display panel under the control of the controller processor 10.

The controller input unit 14 includes input devices, detects an input signal via the input devices, and outputs the input signal to the controller processor 10. The controller processor 10 performs processing, which corresponds to an input content via the input devices, on the basis of an input content from the controller input unit 14. The controller 2 according to this embodiment includes at least a keyboard and a mouse, which serve as the input devices.

A sheet of roll paper and a piece of cut paper can be set in the printer 3. The piece of cut paper includes a piece of paper output by being cut off from a sheet of roll paper. Hereinafter, the sheet of roll paper and the piece of cut paper set in the printer 3 are collectively referred to as a "print medium". The printer 3 according to this embodiment is an ink jet printer and prints an image by using an ink jet head that forms dots. More specifically, the printer 3 according to this embodiment is a large format printer (LFP) in which a large print medium can be set. For example, in a case of using cut paper, a piece of A0-size paper may be set in the printer 3. In a case of using roll paper, a sheet of roll paper exceeding 900 mm in width may be set in the printer 3.

As illustrated in FIG. 1, the printer 3 includes a printer processor 20, a printer communication unit 21, a printer memory 22, and a printing unit 23.

The printer processor 20, which may include a CPU, a ROM, a RAM, an ASIC, a signal processing circuit, and the like, controls each unit of the printer 3. The printer processor 20 performs processing by using hardware or software by, for example: causing the CPU to load into the RAM a program stored in the ROM, the printer memory 22 described below, or the like; using a function implemented in the ASIC; or causing the signal processing circuit to process signals.

The printer communication unit 21 communicates with the controller 2 under the control of the printer processor 20 in accordance with a predetermined communication standard.

The printer memory 22 includes a non-volatile memory and stores various kinds of data.

Firmware 22a is installed in the printer 3. The printer processor 20 loads and executes the firmware 22a, thereby performing various processing operations described below by using functions of the firmware 22a.

The printing unit 23 includes elements for forming dots on a print medium, such as an ink jet head that discharges ink onto a print medium set in the printer 3 and forms dots and a carriage that moves the ink jet head.

A transport unit 24 includes elements for transporting a print medium, such as a transport roller that transports a print medium and a transport motor that rotates the transport roller.

A cutting unit 25 includes elements for cutting a print medium, such as a cutter that cuts a print medium and a cutter motor that moves the cutter.

The controller processor 10 controls the transport unit 24 and causes the transport unit 24 to transport a print medium and also controls the printing unit 23 and causes the printing unit 23 to print an image on a print medium by forming dots on the print medium. In addition, the controller processor 10 controls the cutting unit 25 and causes the cutting unit 25 to cut a print medium at a specific point.

In this embodiment, a user can print images on both sides of a print medium by using the printer 3.

The printing of images on both sides of a print medium is performed according to the following process. It should be noted that the following process is one of a plurality of possible processes.

First, a sheet of roll paper is set in the printer 3. Next, the printer 3 prints an image on a first side of the sheet of roll paper. A first side of a sheet of roll paper is a side that faces the ink jet head in a state in which the sheet of roll paper is set in the printer 3 and on which the ink jet head forms dots.

After the image is printed on the first side, the cutting unit 25 cuts the sheet of roll paper so as to output a piece of paper, on the first side of which the image is printed. Hereinafter, a piece of paper output by being cut off from a sheet of roll paper is referred to as a "piece of output paper".

Subsequently, the user sets the piece of output paper in the printer 3. Here, the user sets the piece of output paper in the printer 3 to enable dots to be formed by the ink jet head on a second side of the piece of output paper. A second side is the side opposite a first side. The printer 3 according to this embodiment has a structure in which a piece of output paper can be set while a sheet of roll paper is being set.

Accordingly, the printer 3 prints an image on the set piece of output paper.

In accordance with the above-described process, the images are printed on both sides of the print medium.

Meanwhile, a host computer having a function of displaying a preview for images to be printed by a device with a printing function is widespread. A user can visualize the appearance of the images to be printed on a print medium by referring to the preview. The user can also modify the appearance of the images to be printed on a print medium as needed by editing images.

In this embodiment, images may be printed on both sides of a print medium by the printer 3 in accordance with the above-described process. In this case, the controller 2 displays a preview such that the images are displayed on the preview in a manner appropriately showing that the images are to be printed on both sides of a print medium.

Processing operations relating to the controller 2 and the printer 3 in a case of printing images on both sides of a print medium will be described below.

FIG. 2 shows flowcharts illustrating operations relating to the controller 2 and the printer 3 in a case of printing images on both sides of a print medium. In FIG. 2, flowchart FA illustrates operations relating to the controller 2 and flowchart FB illustrates operations performed by the printer 3.

The controller processor 10 of the controller 2 performs processing operations illustrated in flowchart FA in FIG. 2 by loading and executing the control program 12a and related software, such as an API. That is, the control program 12a causes the controller processor 10 to perform processing operations described below.

As illustrated in flowchart FA in FIG. 2, a user operates at least one of the input devices of the controller 2 and starts the control program 12a. Next, the user operates at least one of the input devices and enters a command to display an image file selection screen G1 (FIGS. 3 and 4). In a case of printing images on both sides of a print medium by using the printer 3, the user enters a command to display the image file selection screen G1 (step S1).

When the command to display the image file selection screen G1 is detected, the controller processor 10 of the controller 2 controls the controller display 13 and causes the display panel to display the image file selection screen G1 (step SA1).

FIGS. 3 and 4 are views of the image file selection screen G1.

The image file selection screen G1 is a screen for selecting one or more image files, each of which corresponds to a page image (described below) to be printed on a print medium.

The user stores in advance one or more image files (image data) in a specific folder (hereinafter referred to as the "storage folder"). For ease of description, it is assumed that the user stores plural image files in the storage folder in advance.

As illustrated in FIGS. 3 and 4, the image file selection screen G1 includes a pre-selection file display area A1a and a post-selection file display area A1b.

A list of file names FM1 of the image files stored in the storage folder is displayed in the pre-selection file display area A1a.

A thumbnail image SG1 of an image recorded in each image file is displayed on a right side of each of the file names FM1 of the image files. The user can accurately view the content of the image recorded in each image file by referring to the thumbnail image SG1.

A checkbox CB1, which may be checked or unchecked, is displayed on a left side of each of the file names FM1.

The user checks the checkbox CB1 corresponding to the file name FM1 of the image file of a page image that the user desires to print on a print medium. Subsequently, the user operates a selection confirmation button SB1 while the checkbox CB1 is checked.

Selection of an image file performed by a user is completed by checking a checkbox CB1 corresponding to the image file and then operating the selection confirmation button SB1.

FIG. 3 illustrates the image file selection screen G1 in an initial state in which no image file is selected.

A list of the file names of the image files having been selected by the user in the above-described manner is displayed in the post-selection file display area A1b (see FIG. 4).

In the post-selection file display area A1b, the file names of the image files are displayed in blocks BL1. The blocks BL1 are arranged in the post-selection file display area A1b in an order from the top to the bottom. The blocks BL1 are objects that can each be dragged and dropped so that the user can reorder the file names of the image files in the post-selection file display area A1b by dragging and dropping the blocks BL1. Hereinafter, an order of image files according to an order of file names in the post-selection file display area A1b is referred to as an "image order".

FIG. 4 illustrates the image file selection screen G1 after plural image files have been selected by the user.

As illustrated in FIGS. 3 and 4, the image file selection screen G1 includes a confirmation button BK1 for confirming an input operation on the image file selection screen G1 and giving a command to change the image file selection screen G1 to a subsequent screen. The user operates the confirmation button BK1 after selecting the image files (step S2).

When it is detected that the user has operated the confirmation button BK1, the controller processor 10 controls the controller display 13 and causes the display panel to display a preview G2 (FIG. 5) (step SA2).

FIG. 5 is a view of the preview G2. To be specific, the preview G2 in FIG. 5 illustrates a screen, caused by the controller processor 10, to be initially displayed after operation of the confirmation button BK1 has been detected (a screen that is not edited by the user). The preview G2, caused by the controller processor 10, to be initially displayed is hereinafter referred to as the "preview G2 in an initial state" when appropriate to differentiate this screen from the preview G2 that has been edited by the user.

FIG. 5 illustrates the preview G2 in an initial state that is displayed in a case in which six image files have been selected. The six image files correspond to the six file names displayed in the pre-selection file display area A1a of the image file selection screen G1 in FIG. 3.

As illustrated in FIG. 5, the preview G2 includes a first side display area A21 and a second side display area A22.

The first side display area A21 is an area illustrating the first side of the sheet of roll paper set in the printer 3. That is, the first side display area A21 is an area illustrating a front view of the first side of the sheet of roll paper set in the printer 3 at a certain scale. A scale representing an actual dimension is displayed along each of a short side and a long side of the first side display area A21.

The second side display area A22 is an area illustrating the second side of the sheet of roll paper set in the printer 3. That is, the second side display area A22 is an area illustrating a front view of the second side of the sheet of roll paper set in the printer 3 at a certain scale. A scale representing an actual dimension is displayed along each of a short side and a long side of the second side display area A22.

As illustrated in FIG. 5, the first side display area A21 and the second side display area A22 are displayed such that the first side display area A21 and the second side display area A22 are arranged side by side while positions in a longitudinal direction are aligned. That is, the first side illustrated by the first side display area A21 and the second side illustrated by the second side display area A22 represent the same area of the first side and the second side of the actual sheet of roll paper. In addition, the first side display area A21 and the second side display area A22 are displayed on the preview G2 such that the first side display area A21 and the second side display area A22 are arranged side by side while reflecting the relationship of positions in a longitudinal direction on the actual sheet of roll paper.

As illustrated in FIG. 5, on the preview G2 in the initial state, page images PG2, each of which corresponds to a respective image file having been selected by the user, are displayed with a specific appearance.

Here, a page image means an image described below. A page image means an image displayed on the preview G2 on the basis of an image file and also means an image to be printed on a print medium on the basis of an image file.

Accordingly, in a case in which the term "page image" is used in a description of the preview G2, it means neither a whole image displayed in the first side display area A21 or the second side display area A22, nor some of or all of the images displayed on the preview G2 as a whole, but an individual image displayed on the basis of an image file. Similarly, in a case in which the term "page image" is used in a description of an image printed on a print medium, it means neither a whole image printed on the print medium, nor some of or all of the images printed on the print medium as a whole, but an individual image printed on the basis of an image file.

As illustrated in FIG. 5, the controller processor 10 divides the plural page images PG2 between the first side display area A21 and the second side display area A22 and displays the divided page images PG2. In the example of FIG. 5, three page images PG2 are displayed in the first side display area A21, and the other three page images PG2 are displayed in the second side display area A22.

The controller processor 10 divides the page images PG2 in the manner described below.

As described above, the image order is determined in accordance with the order of the blocks BL1 in the post-selection file display area A1b. The controller processor 10 allocates to the first side display area A21 the page images PG2 that correspond to the image files at the odd-numbered positions in the image order, and to the second side display area A22 the page images PG2 that correspond to the image files at the even-numbered positions in the image order.

The preview G2 in FIG. 5 is a screen displayed by the controller processor 10 in the case in which the input operation on the image file selection screen G1 is confirmed in accordance with the content of the image file selection screen G1 illustrated in FIG. 4. Hereinafter, the image file having the file name "AAA" displayed in the post-selection file display area A1b of the image file selection screen G1 in FIG. 4 is referred to as the image file Fa, the image file having the file name "BBB" is referred to as the image file Fb, the image file having the file name "CCC" is referred to as the image file Fc, the image file having the file name "DDD" is referred to as the image file Fd, the image file having the file name "EEE" is referred to as the image file Fe, and the image file having the file name "FFF" is referred to as the image file Ff.

In the case in which the input operation on the image file selection screen G1 is confirmed in accordance with the content of the image file selection screen G1 in FIG. 4, the image order is as follows: image file Fa, image file Fb, image file Fc, image file Fd, image file Fe, and image file Ff. In this case, the controller processor 10 allocates to the first side display area A21 the image file Fa (the first image file), the image file Fc (the third image file), and the image file Fe (the fifth image file), which are the image files at the odd-numbered positions in the image order. The controller processor 10 allocates to the second side display area A22 the image file Fb (the second image file), the image file Fd (the fourth image file), and the image file Ff (the sixth image file), which are the image files at the even-numbered positions in the image order.

As illustrated FIG. 5, the controller processor 10 arranges the page images PG2 from the top to the bottom of the first side display area A21 in ascending order of the image order. Likewise, the controller processor 10 arranges the page images PG2 from the top to the bottom of the second side display area A22 in ascending order of the image order.

It should be noted that, on the preview G2, a direction toward the top corresponds to a transport direction of the sheet of roll paper set in the printer 3. The sheet of roll paper is being transported in the transport direction by the transport unit 24, while images are printed by the printing unit 23 on the sheet of roll paper set in the printer 3 as appropriate.

The positional relationship between the first side display area A21 and the area of the page image PG2 displayed in the first side display area A21 is according to the positional relationship between an area of the first side of the actual print medium and an area of the page image to be printed on the actual print medium. Accordingly, in a case in which the user enters a command to perform printing in accordance with the content of the preview G2, the relative positions of the page images PG2 to the first side display area A21 displayed on the preview G2 corresponds to the relative positions of the page images to the area of the first side of the actual print medium. This is the same as in the second side display area A22. As a result, in a state in which a positional relationship between a position of a page image on the first side of a print medium and a position of a page image on the second side of a print medium are shown, one or more page images PG2 on the first side and one or more page images PG2 on the second side are displayed on the preview G2. That is, in a state in which a positional relationship between a position of a page image on the first side of a print medium and a position of a page image on the second side of a print medium are shown, the controller processor 10 causes the preview G2 to be displayed in which one or more page images on the first side and one or more page images on the second side are displayed.

As illustrated in FIG. 5, in each of the first side display area A21 and the second side display area A22, a blank area Q2 is formed between the page images PG2 adjacent to each other in the longitudinal direction (a direction corresponding to the transport direction). On the preview G2, a position of a blank area Q2 in the longitudinal direction of the first side display area A21 corresponds to a position of a blank area Q2 in the longitudinal direction of the second side display area A22.

To be specific, a blank area Q2a is formed in the first side display area A21 between a page image PG2a corresponding to the image file Fa and a page image PG2c corresponding to the image file Fc. A blank area Q2b is formed in the second side display area A22 between a page image PG2b corresponding to the image file Fb and a page image PG2d corresponding to the image file Fd. The blank area Q2a in the first side display area A21 and the blank area Q2b in the second side display area A22 are arranged such that part of the blank area Q2a and part of the blank area Q2b are at the same position in the longitudinal direction.

Similarly, a blank area Q2c is formed in the first side display area A21 between the page image PG2c corresponding to the image file Fc and a page image PG2e corresponding to the image file Fe. A blank area Q2d is formed in the second side display area A22 between the page image PG2d corresponding to the image file Fd and a page image PG2f corresponding to the image file Ff. The blank area Q2c in the first side display area A21 and the blank area Q2d in the second side display area A22 are arranged such that part of the blank area Q2c and part of the blank area Q2d are at the same position in the longitudinal direction. When displaying the preview G2 in an initial state, the controller processor 10 adjusts the positions of the page images PG2 in the first side display area A21 and the positions of the page images PG2 in the second side display area A22 so that a position of a blank area Q2 between the page images PG2 in the first side display area A21 corresponds to a position of a blank area Q2 between the page images PG2 in the second side display area A22.

As illustrated in FIG. 5, on the preview G2, a dividing line KY2 (image representing a boundary) extending in a transverse direction is displayed across a blank area Q2 in the first side display area A21 and a blank area Q2 in the second side display area A22, whose positions correspond to each other. The dividing line KY2 is arranged such that it does not overlap the page image PG2.

To be specific, the blank area Q2a in the first side display area A21 and the blank area Q2b in the second side display area A22 are the blank areas Q2 that are arranged at positions corresponding to each other. A dividing line KY2a extending in the transverse direction is displayed across the blank area Q2a and the blank area Q2b. Likewise, the blank area Q2c in the first side display area A21 and the blank area Q2d in the second side display area A22 are the blank areas Q2 that are arranged at positions corresponding to each other. A dividing line KY2b extending in the transverse direction is displayed across the blank area Q2c and the blank area Q2d. The meaning of the dividing line KY2 will be described below.

When displaying the preview G2 in the initial state, the controller processor 10 causes the dividing line KY2 (image representing a boundary) to be displayed at a position corresponding to the blank areas Q2.

A cut line CT2 is displayed below the page images PG2 arranged at the bottommost positions on the preview G2 among the page images PG2 displayed in the first side display area A21 and the page images PG2 displayed in the second side display area A22. A cut line CT2 is an image representing a position at which cutting is performed after an image is printed on the first side in a case of printing on both sides of a print medium.

As illustrated in FIG. 5, on the preview G2, the page images PG2 in the first side display area A21 and the page images PG2 in the second side display area A22 are arranged in the first side display area A21 and in the second side display area A22 in one-to-one correspondence.

More specifically, "an area A21a between the top end of the first side display area A21 and the dividing line KY2a in the first side display area A21" and "an area A22a between the top end of the second side display area A22 and the dividing line KY2a in the second side display area A22" are areas divided with respect to the dividing line KY2a and arranged at positions corresponding to each other. One page image, the page image PG2a, is arranged in the area A21a in the first side display area A21, and another page image, the page image PG2b, is arranged in the area A22a in the second side display area A22. That is, two page images PG2 are respectively arranged in the areas in the first side display area A21 and the second side display area A22 between the top ends of the first side display area A21 and the second side display area A22 and the dividing line KY2a in a one-to-one relationship.

Similarly, "an area A21b between the dividing line KY2a and the dividing line KY2b in the first side display area A21" and "an area A22b between the dividing line KY2a and the dividing line KY2b in the second side display area A22" are areas divided with respect to the dividing line KY2a and the dividing line KY2b and arranged at positions corresponding to each other. One page image, the page image PG2c, is arranged in the area A21b in the first side display area A21, and another page image, the page image PG2d, is arranged in the area A22b in the second side display area A22. That is, two page images PG2 are respectively arranged in the areas in the first side display area A21 and the second side display area A22 between the dividing line KY2a and the dividing line KY2b in a one-to-one relationship.

Likewise, "an area A21c between the dividing line KY2b and the cut line CT2 in the first side display area A21" and "an area A22c between the dividing line KY2b and the cut line CT2 in the second side display area A22" are areas divided with respect to the dividing line KY2b and the cut line CT2 and arranged at positions corresponding to each other. One page image, the page image PG2e, is arranged in the area A21c in the first side display area A21, and another page image, the page image PG2f, is arranged in the area A22c in the second side display area A22. That is, two page images PG2 are respectively arranged in the areas in the first side display area A21 and the second side display area A22 between the dividing line KY2b and the cut line CT2 in a one-to-one relationship.

That is, when displaying the preview G2 in an initial state, the controller processor 10 adjusts the positions of the page images PG2 in the first side display area A21 and the positions of the page images PG2 in the second side display area A22 so that the page images PG2 in the first side display area A21 and the page images PG2 in the second side display area A22 are in one-to-one relationships.

The preview G2 in the initial state is displayed in the above-described manner, thereby resulting in the results described below.

When the user enters a command to print the content of the preview G2, the page images are printed on the first side of a print medium with the same appearance as the appearance of the page images PG2 in the first side display area A21 of the preview G2. Likewise, the page images are printed on the second side of the print medium with the same appearance as the appearance of the page images PG2 in the second side display area A22 of the preview G2.

The appearance of the page images PG2 in the first side display area A21 of the preview G2 in the initial state and the appearance of the page images PG2 in the second side display area A22 of the preview G2 in the initial state are assumed to be the appearance with which the user desires to actually print the page images on the first side and the second side of a print medium. The reason is as follows.

On the preview G2, a position of a blank area Q2 in the longitudinal direction (a direction corresponding to the transport direction) of the first side display area A21 corresponds to a position of a blank area Q2 in the longitudinal direction of the second side display area A22. The dividing line KY2 is displayed so as to correspond to the blank areas Q2 arranged at the positions corresponding to each other. As illustrated in FIG. 5, on the preview G2, the page images PG2 in the first side display area A21 and the page image PG2 in the second side display area A22 are arranged in the first side display area A21 and the second side display area A22 so as to be in one-to-one relationships.

With this arrangement, when a print medium is cut at the dividing line KY2 in a state in which the page images are printed on the first side and the second side of the print medium, on a piece of output paper output by the cutting operation, one page image PG2 is printed on the first side without lack and another page image PG2 is printed on the second side without lack. Here, prior research has shown that a user, who desires to print two or more page images on both the first side and the second side, needs to produce pieces of output paper on which one page image is printed on the first side and one page image is printed on the second side. Accordingly, the appearance of the page images PG2 in the first side display area A21 of the preview G2 in the initial state and the appearance of the page images PG2 in the second side display area A22 of the preview G2 in the initial state are assumed to be the appearance with which the user desires to actually print the page images on the first side and the second side of a print medium.

As illustrated in FIG. 5, on the preview G2, a checkbox CB2 is displayed on a left side of each dividing line KY2. In a case in which the user desires to cut a print medium at the dividing line KY2, the user checks the checkbox CB2. As will be described below, in a case in which a checkbox CB2 corresponding to a dividing line KY2 is checked, a print medium is automatically cut at a position corresponding to the dividing line KY2 when printing processing on the print medium is performed.

Here, the user can edit the preview G2.

Editing the preview G2 includes modifying the appearance of the page images PG2 displayed on the preview G2. The modifying the appearance of the page images PG2 includes changing a position of the page image PG2, enlarging, reducing, rotating, and deleting the page image PG2. More specifically, the changing a position of the page image PG2 includes changing a position of the page image PG2 between the first side display area A21 and the second side display area A22. That is, the user can move the page image PG2 displayed in the first side display area A21 of the preview G2 in the initial state to the second side display area A22. Similarly, the user can move the page image PG2 displayed in the second side display area A22 to the first side display area A21.

The editing the preview G2 includes changing a position of the dividing line KY2 in the longitudinal direction (a direction corresponding to the transport direction), adding and deleting the dividing line KY2.

That is, the controller processor 10 displays the page image PG2 such that modifying the appearance of the page image PG2, which includes moving the page image PG2 to and from the first side display area A21 and the second side display area A22, can be performed.

The user can adjust an appearance of the page image to be printed on a print medium and/or a cutting position of a print medium by editing the preview G2. However, as described above, the content of the preview G2 in the initial state is assumed to be the content that the user desires. As a result, the user's workload for editing can be reduced.

FIG. 6 is a view of an example of the preview G2 after the preview G2 in the initial state illustrated in FIG. 5 is edited.

In FIG. 6, the page image PG2c displayed in the first side display area A21 of the preview G2 in the initial state is moved to the second side display area A22. In addition, the dividing line KY2b is deleted. The position of the dividing line KY2a is changed.

As illustrated in FIG. 5, the preview G2 includes a confirmation button BK2 for confirming the content of the preview G2 and giving a command to print the content of the preview G2. When entering a command to print the content of the preview G2, the user operates the confirmation button BK2.

In addition, the preview G2 includes a display button BB2 for giving a command to display a superimposition preview G3 (FIG. 7). In a case in which the user desires to display the superimposition preview G3, the user operates the display button BB2.

As illustrated in flowchart FA in FIG. 2, after causing the preview G2 to be displayed, the controller processor 10 observes whether the display button BB2 is operated (step SA3) while observing whether the confirmation button BK2 is operated (step SA4).

In a case in which it is detected that the display button BB2 is operated (Yes in step SA3), the controller processor 10 controls the controller display 13 and causes the display panel to display the superimposition preview G3 (step SA5).

FIG. 7 is a view of the superimposition preview G3. To be specific, FIG. 7 illustrates the superimposition preview G3 displayed in a case in which the display button BB2 is operated on the preview G2 displaying the content displayed in FIG. 5.

As apparent by comparing FIG. 5 with FIG. 7, the superimposition preview G3 includes a superimposed display area A3. In the superimposed display area A3, the first side display area A21 and the second side display area A22, which are in the state immediately before an operation on the display button BB2, are displayed in a superimposed manner.

As illustrated in FIG. 7, on the superimposition preview G3, the page images PG2 having been displayed in the first side display area A21 of the preview G2 and the page images PG2 having been displayed in the second side display area A22 of the preview G2 are displayed in a superimposed manner in the superimposed display area A3. Also, on the superimposition preview G3, the dividing line KY2 and the cut lines CT2 are displayed at the same positions as on the preview G2.

That is, the controller processor 10 causes the superimposition preview G3 to be displayed, in which the page images PG2 on the first side and the page images PG2 on the second side are displayed in a superimposed manner, such that positional relationships between the page images on the first side and the page images on the second side are shown.

As described above, in the superimposed display area A3 of the superimposition preview G3, both the page images PG2 on the first side and the page images PG2 on the second side are displayed in a superimposed manner such that positional relationships of the page images between the first side and the second side are shown. As a result, by referring to the superimposition preview G3, the user can intuitively and accurately grasp positional relationships between the page images on the first side and the page images on the second side in the state in which the page images are printed on a print medium. It should be noted that the page images PG2 on at least one of the first side and the second side may be translucent when displayed on the superimposition preview G3. This enables the user to easily visualize relationships of the page images on both sides on a print medium when printed, even though the page image PG2 are superimposed.

As illustrated in FIG. 7, the superimposition preview G3 includes a back button BC3. The back button BC3 is a button for giving a command to display the preview G2. In a case in which the user reviews the content of the superimposition preview G3 and desires to display the preview G2 again, the user operates the back button BC3.

As illustrated in flowchart FA in FIG. 2, after displaying the superimposition preview G3, the controller processor 10 observes whether the back button BC3 is operated (step SA6). In a case in which it is detected that the back button BC3 is operated (yes in step SA6), the controller processor 10 causes the processing step to move to step SA2 and display the preview G2.

In a case in which it is detected that the confirmation button BK2 is operated (yes in step SA4), the controller processor 10 generates first side print data and second side print data (step SA7).

After the confirmation button BK2 is operated, the controller processor 10 continues to display the preview G2.

A more detailed description of the processing in step SA7 is as follows. The controller processor 10 generates the first side print data for giving a command to print the page images on the first side of a print medium with the same appearance as the appearance of the page images PG2 in the first side display area A21 on the basis of the content of the first side display area A21 at the time when the confirmation button BK2 is operated. The controller processor 10 generates the first side print data on the basis of the image files corresponding to the page images PG2 in the first side display area A21 by using a function of the control program 12a.

The first side print data includes a control command to perform cutting at a position corresponding to the cut line CT2. The first side print data further includes another control command to transport a print medium suitably with respect to the blank areas Q2 in the first side display area A21, and blank spaces at a leading end and a trailing end. The first side print data includes raster data corresponding to the page images to be printed. That is, the first side print data appropriately includes information necessary to print the page images on the first side of a print medium with the same appearance as the appearance of the page images PG2 in the first side display area A21.

In addition, the controller processor 10 generates the second side print data for giving a command to print the page images on the second side of a print medium with the same appearance as the appearance of the page images PG2 in the second side display area A22 on the basis of the content of the second side display area A22 at the time when the confirmation button BK2 is operated. The controller processor 10 generates the second side print data on the basis of the image files corresponding to the page images PG2 in the second side display area A22 by using a function of the control program 12a.

The second side print data includes a control command to cut a print medium at the dividing line KY2 whose corresponding checkbox CB2 is checked. In addition, the second side print data appropriately includes information necessary to print the page images on the second side of a print medium with the same appearance as the appearance of the page images PG2 in the second side display area A22.

Next, the controller processor 10 controls the controller communication unit 11 and transmits the first side print data generated in step SA7 to the printer 3 (step SA8).

As illustrated in flowchart FB in FIG. 2, the printer processor 20 of the printer 3 controls the printer communication unit 21 and receives the first side print data (step SB1).

Subsequently, the printer processor 20 starts processing based on the first side print data (step SB2). The printer processor 20 controls the printing unit 23 and the transport unit 24 and performs printing of images on the first side of the sheet of roll paper on the basis of the first side print data received in step SB1. The printer processor 20 controls the cutting unit 25 and cuts the sheet of roll paper at a position corresponding to the cut line CT2.

After the processing based on the first side print data is started, the controller processor 10 and the printer processor 20 perform progress observation processing (step SA9 and step SB3). In the progress observation processing, every time printing one page image is completed, the printer processor 20 notifies the controller processor 10 of completion of printing the page image. As described above, after the confirmation button BK2 is operated, the controller processor 10 continues to display the preview G2. When the controller processor 10 is notified of completion of printing one page image, an image representing the completion of printing is displayed on the preview G2 in association with the page image PG2 having just been printed among the page images PG2 displayed on the preview G2. For example, the controller processor 10 displays an image including the word "printed" on the page image PG2.

As illustrated in flowchart FB in FIG. 2, after the processing based on the first side print data is started, the printer processor 20 observes whether the processing based on the first side print data is completed (step SB4). When the processing based on the first side print data is completed, the sheet of roll paper has been cut at a position corresponding to the cut line CT2 and a piece of output paper, on the first side of which one or more page images are printed, has been output.

When the processing based on the first side print data is completed (yes in step SB4), the printer processor 20 informs the user that the processing has been completed (step SB5). For an example, in a case in which the printer 3 includes a display panel or a LED, the printer processor 20 informs the user by using these. For another example, the printer processor 20 transmits information indicating completion of processing to the controller 2, and causes the controller processor 10 of the controller 2 to display the information indicating completion of processing.

The user sets in the printer 3 the piece of output paper output in response to completion of processing of the first side print data. As described above, the user sets the piece of output paper in the printer 3 such that the second side of the piece of output paper is to be the print target side. It should be noted that setting of the piece of output paper is appropriately performed by the user, while matching of the leading edge of the set piece of output paper is appropriately performed by the printer 3.

As illustrated in flowchart FA in FIG. 2, after setting the piece of output paper in the printer 3, the user operates at least one of the input devices of the controller 2 and enters a command to perform printing on the second side (step S3).

When it is detected that the command to print on the second side is given, the controller processor 10 controls the controller communication unit 11 and transmits the second side print data (step SA10).

As illustrated in flowchart FB in FIG. 2, the printer processor 20 of the printer 3 controls the printer communication unit 21 and receives the second side print data (step SB6).

Subsequently, the printer processor 20 starts processing based on the second side print data (step SB7). The printer processor 20 controls the printing unit 23 and the transport unit 24 and performs printing of images on the second side of the sheet of roll paper on the basis of the second side print data received in step SB6. The printer processor 20 controls the cutting unit 25 and cuts the sheet of roll paper at a position corresponding to the dividing line KY2 whose corresponding checkbox CB2 is checked.

After the processing based on the second side print data is started, the controller processor 10 and the printer processor 20 perform progress observation processing (step SA1 and step SB8).

As illustrated in flowchart FB in FIG. 2, after the processing based on the second side print data is started, the printer processor 20 observes whether the processing based on the second side print data is completed (step SB9). When the processing based on the second side print data is completed, the sheet of roll paper has been cut at a position corresponding to the dividing line KY2 whose corresponding checkbox CB2 is checked.

When the processing based on the second side print data is completed (yes in step SB9), the printer processor 20 informs the user that the processing has been completed (step SB10).

As described above, in this embodiment, the controller 2 includes the controller processor 10 (processor) that causes the preview G2 to be displayed for an image to be printed on a print medium by the printer 3. The controller processor 10 displays the preview G2, which includes one or more page images on the first side and one or more page images on the second side, in such a manner that a positional relationship between a position of a page image on the first side of a print medium and a position of a page image on the second side of the print medium are shown. The controller processor 10 also adjusts the position of the page image on the first side and the position of the page image on the second side so that a position of a blank area between the page images on the first side corresponds to a position of a blank area between the page images on the second side.

This configuration enables the user to accurately grasp positional relationships between the page images on the first side and the page images on the second side by referring to the preview G2. Furthermore, with this configuration, the controller processor 10 adjusts the position of the page image on the first side and the position of the page image on the second side so that a position of a blank area between the page images on the first side corresponds to a position of a blank area between the page images on the second side. As a result, the page images are arranged at appropriate positions on the preview G2 on the basis of printing to be performed on both the first side and the second side. That is, when the controller processor 10 displays the preview for the images to be printed on both sides of a print medium, the preview G2 can be displayed such that the images are displayed on the preview G2 in a manner appropriately showing that the images are to be printed on both sides of a print medium.

In this embodiment, the controller processor 10 allocates to the first side or the second side the page images selected as page images to be displayed on the preview G2 and adjusts positions of the page images on the first side and positions of the page images on the second side.

With this configuration, the preview G2 is displayed in a state in which the page images selected as page images to be displayed on the preview G2 are allocated by the controller processor 10 to the first side or the second side. As a result, the preview G2 can be an appropriate screen on the basis of printing to be performed on both the first side and the second side.

In this embodiment, the controller processor 10 adjusts the positions of the page images on the first side and the positions of the page images on the second side in such a manner that the page images on the first side and the page images on the second side are arranged in one-to-one correspondence.

With this configuration, the preview G2 is displayed such that the positions of the page images on the first side and the positions of the page images on the second side are adjusted by the controller processor 10 in such a manner that the page images on the first side and the page images on the second side are arranged in one-to-one correspondence. As a result, the preview G2 can be an appropriate screen on the basis of printing to be performed on both the first side and the second side.

In this embodiment, the controller processor 10 displays an image representing a boundary between the page images at a position corresponding to a blank area.

This configuration enables the user to accurately grasp a positional relationship between a blank area on the first side and a blank area on the second side by referring to the preview G2.

In this embodiment, the controller processor 10 displays the page images in such a manner that modifying the page images, which includes moving the page images to and from the first side and the second side, can be performed.

With this configuration, the user can perform adjustment on an appearance of a page image. The adjustment includes adjusting to select on which of the first side and the second side the page image is to be printed.

In this embodiment, the controller processor 10 shows positional relationships between the page images on the first side and the page images on the second side on a superimposition preview G3, in which the page images on the first side and the page image on the second side are displayed in a superimposed manner.

This configuration enables the user to more accurately grasp positional relationships between the page images on the first side and the page images on the second side by referring to the superimposition preview G3.

On the superimposition preview G3 in this embodiment, the page images PG2 on at least one of the first side and the second side may be translucent when displayed.

This configuration enables the user to easily visualize relationships of the page images on both sides of a print medium when printed, even in a case in which the page image PG2 are displayed in a superimposed manner. That is, this configuration enables the user to more accurately grasp positional relationships between the page images on the first side and the page images on the second side by referring to the superimposition preview G3.

It should be noted that the above-described embodiment describes a form of the invention, and various modifications and applications may be appropriately made within the scope of the invention.

In the above-described embodiment, the controller processor 10 causes a display (the display panel) included in the controller 2 to display the preview G2 and the superimposition preview G3. In this regard, the controller processor 10 may cause a display included in an apparatus other than the controller 2 to display various screens. An apparatus other than the controller 2 may be the printer 3.

Furthermore, in the above-described embodiment, the preview G2 and the superimposition preview G3 are different individual screens. In this regard, an image equivalent to the preview G2 and an image equivalent to the superimposition preview G3 may be displayed on one screen.

Moreover, although in the above-described embodiment a LFP is used as the example of the printer 3, the printer 3 is not limited to a LFP. Additionally, although in the above-described embodiment an ink jet printer is used as the example of the printer 3, the printing method of the printer 3 is not limited to the ink jet method. That is, the printer 3 may be any apparatus having a function of printing on a print medium.

Furthermore, the functional block diagram illustrated in the drawing is a schematic diagram illustrating functional configurations of each apparatus in which functions are classified and shown according to main processing contents for ease of understanding the invention. In the configuration of each apparatus, functions may be classified into more elements in accordance with processing contents. Moreover, one element may perform more processing operations. Further, processing of each element may be performed by using a piece of hardware or plural pieces of hardware. Processing of each element may be performed by using a program or plural programs.

Further, processing steps in flowcharts in the drawing are classified according to main processing contents for ease of understanding processing operations relating to each apparatus. The manner in which processing steps are classified or the descriptions of processing steps in flowcharts do not limit the invention. Processing operations relating to each apparatus may be classified into more processing steps in accordance with processing contents. One processing step may include more processing operations. Provided that similar processing operations can be performed, processing sequence is not limited to the example of processing sequence illustrated in flowcharts.

What is claimed is:

1. A control apparatus comprising:
a processor that causes a preview to be displayed for an image to be printed on each of two sides of a print medium by a printing apparatus; and
a display that displays the preview, wherein
the processor
causes the display to display the preview, the preview including a front side display area and a rear side display area that is next to the front side display area along a transverse direction in the preview, the front side display area including at least a first and second front side page image for printing on a front side of the print medium, the rear side display area including at least a first and second rear side page image for printing on a rear side of the print medium, such that the preview shows a positional relationship along a print direction between a position of each of the front side pages and a position of each of the rear side page images, the print direction of an image in the preview corresponding to a print position of the image on the print medium, the print position in the preview being orthogonal to the transverse direction; and
adjusts the position in the print direction of at least one of the page images such that a position along the print direction of a blank area between the first and second front side page images corresponds to a position along the print direction of a blank area between the first and second rear side page images.

2. The control apparatus according to claim 1, wherein the processor allocates page images, including the first and second front side page images to the front side display area, and allocates page images, including the first and second rear side page images, to the rear side display area and adjusts positions in the print direction of the allocated page images.

3. The control apparatus according to claim 2, wherein the processor adjusts the positions in the print direction of the page images such that each of multiple of the front side page images in the front side display area is in one-to-one correspondence with one or more corresponding rear side page images in the rear side display area.

4. The control apparatus according to claim 1, wherein the processor causes a boundary image to be displayed along the transverse direction, the boundary image representing a boundary between the page images that are displayed, the boundary image being displayed at a position in the print direction corresponding to a blank area between page images in the print direction.

5. The control apparatus according to claim 1, wherein the processor causes the page images to be displayed such that modifying the page images, which includes moving the page images to and from the front side display area and the rear side display area, is capable of being performed.

6. The control apparatus according to claim 1, wherein the processor causes positional relationships between the page images in the front side display area and the page images in the rear side display area to be shown on a superimposition preview in which the page images in the front side display area and the page image on the rear side display area are displayed in a superimposed manner.

7. The control apparatus according to claim 6, wherein the page images in at least one of the front side display area and the rear side display area are translucent when displayed.

8. A non-transitory computer-readable medium storing a program causing a processor of a control apparatus to execute a process, the process comprising:
causing a preview to be displayed for an image to be printed on each of two sides of a print medium by a printing apparatus, the preview including a front side display area and a rear side display area that is next to the front side display area along a transverse direction in the preview, the front side display area including at least a first and second front side page image for printing on a front side of the print medium, the rear side display area including at least a first and second rear side page image for printing on a rear side of the print medium, such that the preview shows a positional relationship along a print direction between a position of each of the front side page images and a position of each of the rear side page images, the print direction of an image in the preview corresponding to a print position of the image on the print medium, the print position in the preview being orthogonal to the transverse direction; and
adjusting the position in the print direction of at least one of the page images such that a position along the print direction of a blank area between the first and second front side page images corresponds to a position along the print direction of a blank area between the the first and second rear side page images.

9. The non-transitory computer-readable medium according to claim 8, the process further comprising
allocating page images including the first and second front side page images to the front side display area, and allocating page images, including the first and second rear side page images, to the rear side display area and adjusting positions in the print direction of the allocated page images.

10. The non-transitory computer-readable medium according to claim 9, the process further comprising
adjusting the positions in the print direction of the page images such that each of multiple of the front side page images in the front side display area is in one-to-one correspondence with one or more corresponding rear side page images in the rear side display area.

11. The non-transitory computer-readable medium according to claim 8, the process further comprising
causing a boundary image to be displayed along the transverse direction, the boundary image representing a boundary between the page images that are displayed, the boundary image being displayed at a position in the print direction corresponding to a blank area between page images in the print direction.

12. The non-transitory computer-readable medium according to claim 8, the process further comprising
causing the page images to be displayed such that modifying the page images, which includes moving the page images to and from the front side display area and the rear side display area, is capable of being performed.

13. The non-transitory computer-readable medium according to claim 8, the process further comprising
causing positional relationships between the page images in the front side display area and the page images in the rear side display area to be shown on a superimposition preview in which the page images in the front side display area and the page image in the rear side display area are displayed in a superimposed manner.

14. The non-transitory computer-readable medium according to claim 13, wherein
the page images in at least one of the front side display area and the rear side display area are translucent when displayed.

* * * * *